Figure 1:
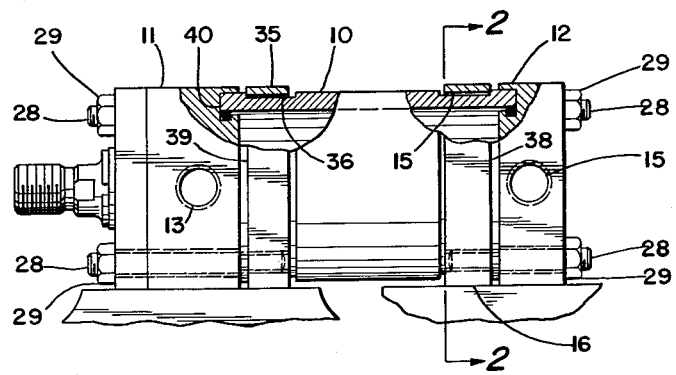

July 10, 1962  O. J. MAHA  3,043,638
FLUID PRESSURE CYLINDER

Filed May 19, 1961  2 Sheets-Sheet 1

INVENTOR.
OTTO J. MAHA
BY
John N. Wolfram
ATTORNEY

INVENTOR.
OTTO J. MAHA
BY
*John N. Wolfram*
ATTORNEY

United States Patent Office 3,043,638
Patented July 10, 1962

1

3,043,638
FLUID PRESSURE CYLINDER
Otto J. Maha, Dundee, Ill., assignor to Parker-Hannifin Corporation, Cleveland, Ohio, a corporation of Ohio
Filed May 19, 1961, Ser. No. 111,262
11 Claims. (Cl. 309—2)

This invention relates to fluid pressure cylinders and more particularly to a means for attaching end caps to the cylinder body.

It is common practice to fabricate cylinder bodies from drawn tubing and to attach end caps to the body by means of tie rods which extend the length of the cylinder from one end cap to the other. In this arrangement the ends of the tubular body usually extend into a circular recess in the adjacent end cap with the tie rods simultaneously bringing both end caps into abutting relation with the ends of the body at the bottom of such recesses. In such case the tie rods extend through the end caps. The end caps thus have a fixed rotative position with respect to each other since the one end cap must be placed in a position with the tie rod holes therein in alignment with the corresponding tie rod holes in the other end cap. If the holes are symmetrically spaced, the one end cap may be rotated an angular increment equal to the angular distance between adjacent holes but cannot be rotated to intermediate angular increments.

In some installations it is desirable that the end caps be rotatable with respect to each other distances intermediate the angular spacing of the tie rods. Also, tie rods are sometimes objectionable from the standpoint of appearance or access to the cylinder body for cleaning or painting. Also, in close quarter installations there sometimes is not enough clearance for the tie rods with other parts of the structure upon which the cylinder is mounted.

Another problem arises in connection with the pipe line connections to the cylinder. Openings are provided in the end caps for introducing fluid under pressure to the cylinder. In some instances it may be desirable to orient the opening in one end cap to a different angular position than in the other end cap. When tie rods are used this may require the making of special end caps to get the openings in the desired angular location.

The present invention avoids the above difficulties by doing away with the tie rods and by mounting the end caps to the cylinder body in such a way that the end cap may be rotated to any angular position on the cylinder body irrespective of the angular position of the other end cap. This is accomplished by providing a groove in the external surface of the tubular body near the end thereof, mounting a split collar having tapped holes therein in the groove, welding the split ends of the collar together so that the collar is permanently and rotatably locked into the groove, and bolting the end cap to the collar. When the bolts are loose both the end cap and collar are rotatable on the body but when they are made tight the end caps and collars are frictionally locked to the body to prevent further rotation.

Figure 2:
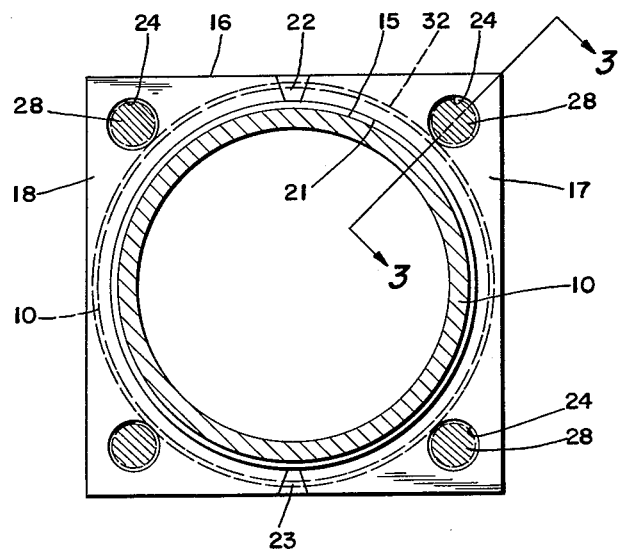
Figure 3:
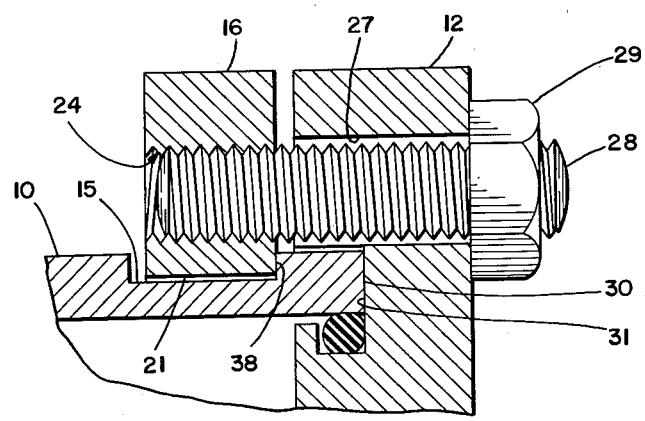
Figure 4:
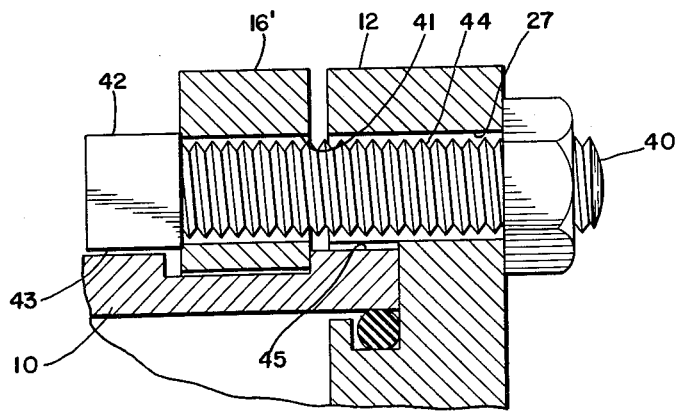
Figure 5:
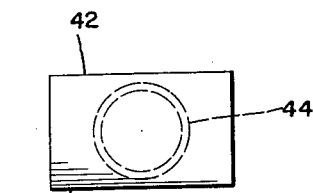

Other objects and advantages of the invention will be apparent from the following description and from the drawings in which:

FIG. 1 is an external plan view of a cylinder,
FIG. 2 is a section view along the lines 2—2 of FIG. 1,
FIG. 3 is a partial section view along the lines 3—3 of FIG. 2,
FIG. 4 shows an optional form in which T head bolts are substituted for studs for fastening the cylinder end cap to the collar, and
FIG. 5 is an end view of such T head bolt.

The cylinder includes a tubular body 10 and a pair of end caps 11 and 12. End cap 11 has a port 13 providing a fluid connection to one end of cylinder body 10 and

2 end cap 12 has a similar port 14 for providing a fluid connection to the other end of the body.

One end of the cylinder body 10 is provided with a circumferential groove 15 in its outer surface. Mounted in this groove is a collar 16. This collar may be initially made in one piece and then sawed transversely in half to form two pieces, 17 and 18, or it may be initially formed in two pieces. Each of the two pieces 17 and 18 have a semi-circular portion which, when the pieces are brought together, as shown in FIG. 2, form a circular opening 21 which is of a diameter slightly larger than the diameter of groove 15. The two pieces 17, 18 are placed in position within groove 15 and are then welded together at 22 and 23 to permanently lock collar 16 within groove 15, the welded collar being rotatable within the groove to any desired angular position with respect to body 10.

The outer surface of the collar may be of any desired configuration but in the form of the invention illustrated it is of square shape. A series of tapped holes 24 are provided at the corners of the square, as shown in FIG. 2.

End cap 12 is preferably formed with an external configuration corresponding to that of collar 16 and of the same transverse dimensions. Cap 12 has a series of openings 27 for receiving studs 28 which are threaded into openings 24. When nuts 29 are drawn tight, end cap 12 is drawn toward cylinder body 10 until the end 30 of the latter is tightly butted against bottom surface 31 of circular recess 32.

The opposite end of cylinder body 10 is provided with a collar 35 which is formed the same as collar 16 as is mounted in a groove 36 at the end of the cylinder body which corresponds to groove 15. End cap 11 is attached to collar 35 by studs 28 and nuts 29 in the same manner as cap 12 is attached to collar 16. Before nuts 29 are tightened end caps 11 and 12 together with their respective collars 35 and 16, may be rotated to any angular position with respect to each other, or with respect to cylinder body 10.

Thus in the event end cap 11 is to have one of its side faces clamped against a face on a supporting member and end cap 12 is likewise to have one of its sides clamped against a face on the supporting member, either end cap 11 or end cap 12 while nuts 29 are loose may be rotated slightly to correct for any misalignment of such supporting faces. Thereafter nuts 29 may be tightened to lock the collars and end caps in their set position by frictional engagement of the side faces 38, 39 with the adjacent respective side walls of grooves 15 and 36, and of the ends of body 10 with the respective recess bottom walls 31, 40.

In the optional form shown in FIG. 4, bolts 40 are substituted for the studs 28 of FIG. 3. In this arrangement collar 16' has drilled holes 41 instead of tapped holes. Bolts 40 have a T head, as shown in FIG. 5, with the distance between sides 42—43 of the head being substantially the same as the diameter of the bolt shank 44. This permits the shank 44 to be closely adjacent the outer diameter 45 of cylinder body 10 without interference from the bolt head. As a result holes 27 and 41 may be very close to the outside diameter 45 of the cylinder body and the size of the square end outline of collar 16 and end caps 11 and 12 may be kept to a minimum. Also, the T bolts may be easily removed for replacement.

I claim:

1. In a fluid pressure cylinder, a body having a bore and an external groove near one end thereof, a collar rotatably mounted in said groove, an end cap for closing said bore, means securing said end cap to said collar, said collar comprising a plurality of members welded together for permanent retention in said groove.

2. A fluid pressure cylinder in accordance with claim 1 in which there are two of said members, each having a semi-circular portion closely fitted within said groove.

3. A fluid pressure cylinder in accordance with claim 1 in which said securing means includes threaded members.

4. A fluid pressure cylinder in accordance with claim 1 in which said collar has threaded openings and said securing means includes members threaded into said openings.

5. In a fluid pressure cylinder, a cylindrical body having a bore and an external groove near one end thereof, a collar loosely fitted within said groove, an end cap for closing said bore, tightenable means securing the end cap to said collar, said collar and end cap being rotatable on said body when said securing means is untightened whereby said collar and cap may be rotated to any desired angular position with respect to said body, and means whereby said collar and end cap are locked in said angular position when said securing means is tightened.

6. A fluid pressure cylinder in accordance with claim 5 in which said collar comprises a pair of members assembled into said groove and welded together for permanent retention therein.

7. A fluid pressure cylinder in accordance with claim 5 in which said locking means comprises frictional engagement of said collar and end cap with said body.

8. In a fluid pressure cylinder, a cylindrical body having a bore therethrough and an external groove near each end thereof, a collar loosely fitted in each groove, an end cap for each end of the bore for closing the same, tightenable means securing each end cap to the adjacent collar, each collar and the end cap secured thereto being rotatable on said body when the respective securing means is untightened whereby each collar with its respective end cap may be rotated to any desired angular position with respect to the other collar and its respective end cap, and means whereby said collars and end caps are locked in said angular positions when said securing means are tightened, each collar comprising a plurality of members assembled into the respective groove and welded together for permanent retention therein.

9. A fluid pressure cylinder in accordance with claim 1 in which said securing means comprises T head bolts passing through holes in said collar and end cap.

10. In a fluid pressure cylinder, a body having a bore and an external groove near one end thereof, a collar rotatably mounted in said groove, an end cap for closing said bore, means securing said end cap to said collar, said collar comprising a plurality of members rigidly secured together for permanent retention in said groove.

11. In a fluid pressure cylinder, a body having a bore, an external groove in said body near one end thereof, said groove having side walls, a collar rotatably mounted on said body with an inner portion thereof disposed within said groove and with movement of said collar longitudinally of said body being restricted by said groove side walls, an end cap for closing said bore, and threaded fasteners extending directly between said collar and said end cap releaseably retaining said end cap on said body in a selected rotated position and closing said bore.

References Cited in the file of this patent

UNITED STATES PATENTS

| | | |
|---|---|---|
| 2,376,566 | Woodling | May 22, 1945 |
| 2,426,108 | Loewe | Aug. 19, 1947 |
| 2,556,698 | Loewe | June 12, 1951 |